(12) United States Patent
Min et al.

(10) Patent No.: US 12,128,848 B2
(45) Date of Patent: Oct. 29, 2024

(54) ROOF AIRBAG FOR VEHICLE

(71) Applicant: HYUNDAI MOBIS CO., LTD., Seoul (KR)

(72) Inventors: Byung Ho Min, Yongin-Si (KR); Hae Kwon Park, Yongin-Si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 18/447,427

(22) Filed: Aug. 10, 2023

(65) Prior Publication Data
US 2023/0382343 A1 Nov. 30, 2023

Related U.S. Application Data

(63) Continuation of application No. 17/555,954, filed on Dec. 20, 2021, now Pat. No. 11,745,688.

(30) Foreign Application Priority Data

Jan. 5, 2021 (KR) .................. 10-2021-0000920
Jan. 11, 2021 (KR) .................. 10-2021-0003459

(51) Int. Cl.
*B60R 21/214* (2011.01)
*B60R 21/231* (2011.01)
(Continued)

(52) U.S. Cl.
CPC .......... *B60R 21/214* (2013.01); *B60R 21/231* (2013.01); *B60R 21/2338* (2013.01);
(Continued)

(58) Field of Classification Search
CPC . B60R 21/214; B60R 21/2338; B60R 21/201; B60R 21/237; B60R 21/232;
(Continued)

(56) References Cited

U.S. PATENT DOCUMENTS 7,976,058 B2   7/2011 Suzuki et al.
11,745,688 B2*  9/2023 Min .................. B60R 21/201
                                                   280/730.1
(Continued)

FOREIGN PATENT DOCUMENTS

KR   10-2012-0033743 A   4/2012

*Primary Examiner* — Keith J Frisby
(74) *Attorney, Agent, or Firm* — NovoTechIP International PLLC (57) ABSTRACT

A roof airbag for a vehicle is proposed. The roof airbag for a vehicle has an airbag cushion configured to be unfolded downward from an inner roof to protect a passenger seated on a seat, and the airbag cushion has a shape bent toward the passenger by a main tether and a sub-tether, thus securing a restraining force for the passenger and safely protecting the passenger from an impact, and the airbag cushion is unfolded downward while avoiding insertion between a roof-side portion of the roof and a headlining by the sub-tether. Specifically, the airbag cushion is prevented from being transversally contracted and an unfolding shape of the airbag cushion is maintained. Furthermore, the fluidity of a gas flow in the airbag cushion is secured, so that the airbag cushion is rapidly unfolded.

14 Claims, 10 Drawing Sheets

(51) Int. Cl.
　　　*B60R 21/2338*　　(2011.01)
　　　*B60R 21/237*　　(2006.01)
　　　*B60R 21/233*　　(2006.01)

(52) U.S. Cl.
　　　CPC .. *B60R 21/237* (2013.01); *B60R 2021/23161* (2013.01); *B60R 2021/23316* (2013.01); *B60R 2021/23382* (2013.01); *B60R 2021/23386* (2013.01)

(58) Field of Classification Search
　　　CPC . B60R 21/231; B60R 21/213; B60R 21/2334; B60R 2021/23386; B60R 2021/23382; B60R 2021/23161; B60R 2021/161; B60R 2021/23316; B60R 2021/23324; B60R 2021/23107
　　　USPC ................................. 280/730.1, 743.2, 743.1
　　　See application file for complete search history.

(56) References Cited

U.S. PATENT DOCUMENTS

| | | | |
|---|---|---|---|
| 2004/0066022 | A1 | 4/2004 | Mori et al. |
| 2005/0206138 | A1 | 9/2005 | Breuninger et al. |
| 2013/0069348 | A1 | 3/2013 | Choi et al. |
| 2015/0203066 | A1 | 7/2015 | Pausch et al. |
| 2019/0161049 | A1* | 5/2019 | Thomas ................ B60R 21/264 |
| 2019/0375363 | A1 | 12/2019 | Abe et al. |
| 2021/0114547 | A1 | 4/2021 | Fischer et al. |

* cited by examiner

ROOF AIRBAG FOR VEHICLE

CROSS-REFERENCE TO RELATED APPLICATIONS

This application is a continuation of co-pending U.S. application Ser. No. 17/555,954 filed on Dec. 20, 2021, which claims the benefit of Korean Patent Application No. 10-2021-0000920, filed Jan. 5, 2021, and Korean Patent Application No. 10-2021-0003459, filed Jan. 11, 2021, the disclosure of which is herein incorporated by reference in their entirety.

BACKGROUND OF THE INVENTION

1. Field of the Invention

The present invention relates generally to a roof airbag for a vehicle, the roof airbag having an airbag cushion configured to be unfolded downward from an inner roof to protect a passenger seated on a seat.

2. Discussion of Related Art

In general, safety devices are installed in vehicles to protect passengers from accidents such as collisions and rollovers. As such safety devices, there are seat belts that restrain the body of a passenger and airbags that mitigate an impact of the passenger hitting the vehicle. The airbags are variously provided in various portions in the vehicle, such as a driver seat airbag provided in a steering wheel, a passenger seat airbag provided in an instrument panel of a passenger seat, etc.

Meanwhile, a vehicle is divided into a front space where front seat passengers are located and a rear space where rear seat passengers are located. In a vehicle collision, there is a problem in that the rear seat passengers are moved forward by inertia to cause a collision between the passengers in the vehicle.

Recently, self-driving vehicles are increasing, and the self-driving vehicles are configured to variously adjust a position of a seat within 360 degrees. Accordingly, the seat positions in the self-driving vehicles may be adjusted such that the front seat passengers and the rear seat passengers face each other. When a vehicle collision occurs while the front seat passengers and the rear seat passengers face each other, the passengers may be injured by a collision between the passengers.

The foregoing is intended merely to aid in the understanding of the background of the present invention, and is not intended to mean that the present invention falls within the purview of the related art that is already known to those skilled in the art.

BRIEF SUMMARY OF THE INVENTION

Accordingly, the present invention has been made keeping in mind the above problem occurring in the related art, and the present invention is intended to provide a roof airbag for a vehicle, in which an airbag cushion is unfolded downward from an inner roof to protect a passenger seated on a seat and the airbag cushion is formed to be bent, so that a passenger is safely protected from an impact.

In order to achieve the above objective, according to one aspect of the present invention, there is provided a roof airbag for a vehicle, the roof airbag including: an airbag cushion configured to be inflated by a gas supplied from an inflator and to be unfolded downward from a roof; a main tether of which opposite ends are connected to opposite ends of the airbag cushion at a first surface of the airbag cushion, the main tether being extended shorter than a vertical length of the airbag cushion; and a sub-tether of which a first end is connected to the roof and a second end is connected to a second surface of the airbag cushion, wherein, when the airbag cushion is unfolded, the airbag cushion may be bent by the main tether, and the sub-tether may guide an unfolding direction of the airbag cushion.

The sub-tether may be extended shorter than a length of the main tether.

The sub-tether may be configured such that a connection position of the second end and an extended length of the sub-tether may be preset, so that a bent portion of the airbag cushion bent by the main tether in unfolding of the airbag cushion may be located at the body of a user seated on a seat.

The sub-tether may be configured to have an area covering some areas of the second surface or an entire area of the second surface of the airbag cushion.

The airbag cushion may be configured to be folded in a zigzag shape when the airbag cushion is folded before unfolding, and the sub-tether may be configured to cover the folded airbag cushion, and thus the sub-tether may be supported by the roof in unfolding of the airbag cushion to guide the airbag cushion so as to prevent the airbag cushion from being unfolded toward the roof.

The sub-tether may have a vertical length longer than a half of the vertical length of the airbag cushion.

The sub-tether may include a plurality of sub-tethers, and the second end of the sub-tether may be connected to each of the opposite side ends of the airbag cushion at the second surface of the airbag cushion.

The airbag cushion may be configured to be folded in a circular shape when being folded before unfolding, and the sub-tether may be connected to the side end of the airbag cushion, and thus unfolding of the airbag cushion may not interfere with the sub-tether.

The first end of the sub-tether may be connected to the roof while being spaced apart from the airbag cushion provided at the roof.

The airbag cushion may include a plurality of dead-lines by which the opposite surfaces of the airbag cushion may be attached to each other to block a flow of gas, the plurality of dead-lines being arranged to be spaced apart from each other along a longitudinal direction, as an inflated direction of the airbag cushion, and being extended in a transverse direction of the airbag cushion while opposite ends of each of the dead-lines may be spaced apart from the opposite side ends of the airbag cushion.

The plurality of dead-lines may be arranged to be spaced apart from each other at predetermined intervals along the longitudinal direction of the airbag cushion, and each interval between the dead-lines may be longer than an interval between one end of each of the dead-lines and one of the side ends of the airbag cushion.

The dead-lines may include divided lines, each of the divided lines being divided in the transversal direction of the airbag cushion, and the dead-lines may be configured to allow the gas to flow between the divided lines.

The dead-lines may include a first line portion and a second line portion, the first line portion being configured to allow the gas to flow between the divided lines divided in the transversal direction of the airbag cushion, and the second line portion being extended in the transversal direction of the airbag cushion.

The first line portion and the second line portion may be repeatedly arranged in an alternated manner in the longitudinal direction of the airbag cushion.

The dead-lines may be arranged such that the first line portion and the second line portion may be arranged in the longitudinal direction of the airbag cushion and then the first line portion may be repeatedly arranged.

One of a plurality of first line portions closest to the inflator in the airbag cushion may be extended such that an outer end of the divided line may be inclined in an inflated direction of the airbag cushion, and remaining first line portions may be extended such that inner ends of the divided line may be inclined in the inflated direction of the airbag cushion.

The second line portion may be formed such that a center portion thereof may be bent toward the divided lines of the first line portion that may be closest to the inflator.

As described above, the roof airbag for a vehicle having the above-described structure has the airbag cushion configured to be unfolded downward from the inner roof to protect the passenger seated on the seat, and the airbag cushion is formed to be bent toward the passenger by the main tether and the sub-tether. Therefore, a restraining force for the passenger is secured and the passenger can be safely protected from an impact. Furthermore, the airbag cushion can be efficiently unfolded without insertion into the roof-side portion of the vehicle body and the headlining by the sub-tether. Specifically, the transversal contraction of the airbag cushion can be prevented and the unfolding shape of the airbag cushion can be maintained. Furthermore, the fluidity of the gas flow in the airbag cushion is secured, so that the airbag cushion can be rapidly unfolded.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Hereinbelow, a roof airbag for a vehicle according to exemplary embodiments of the present disclosure will be described with reference to accompanying drawings.

Figure 1:
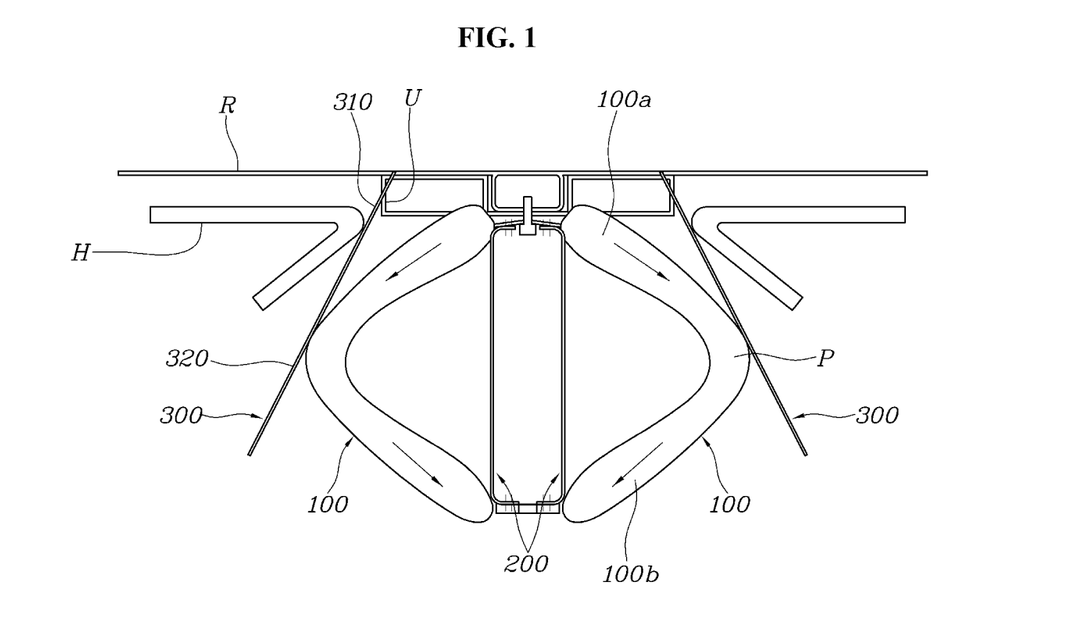
FIG. 1 is a view showing a roof airbag for a vehicle according to the present disclosure.
Figure 2:
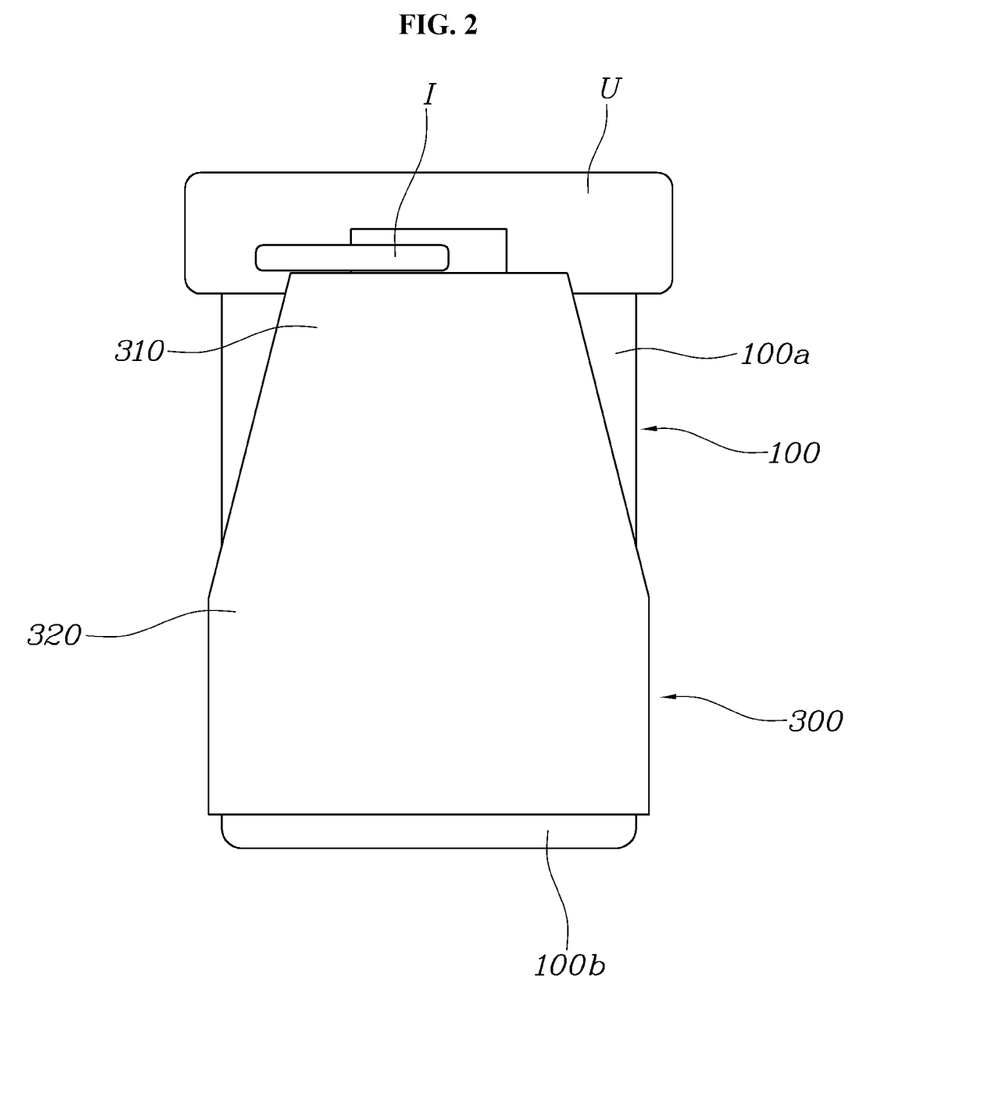
FIG. 2 is a view showing a roof airbag for a vehicle according to a first embodiment of the present disclosure.
Figure 3:
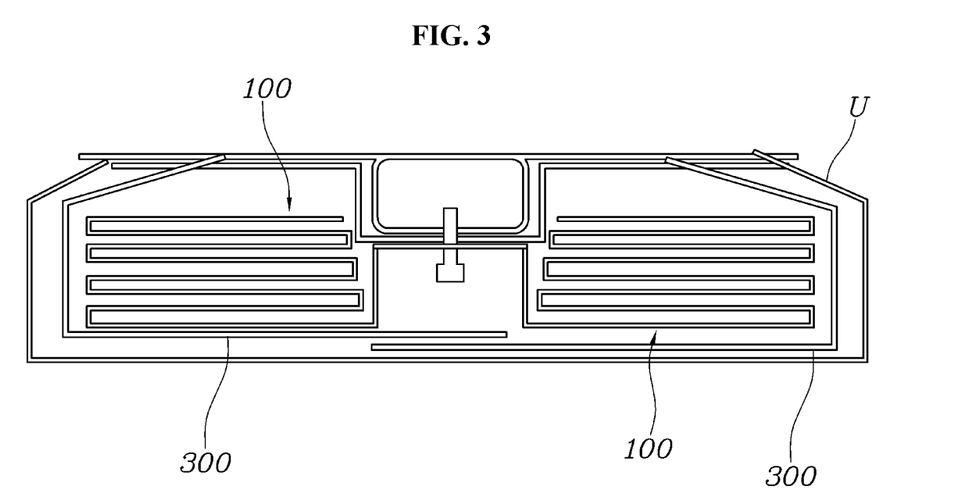
FIG. 3 is a view showing folding of the airbag cushion according to the first embodiment of the present disclosure shown in FIG. 2.
Figure 4:
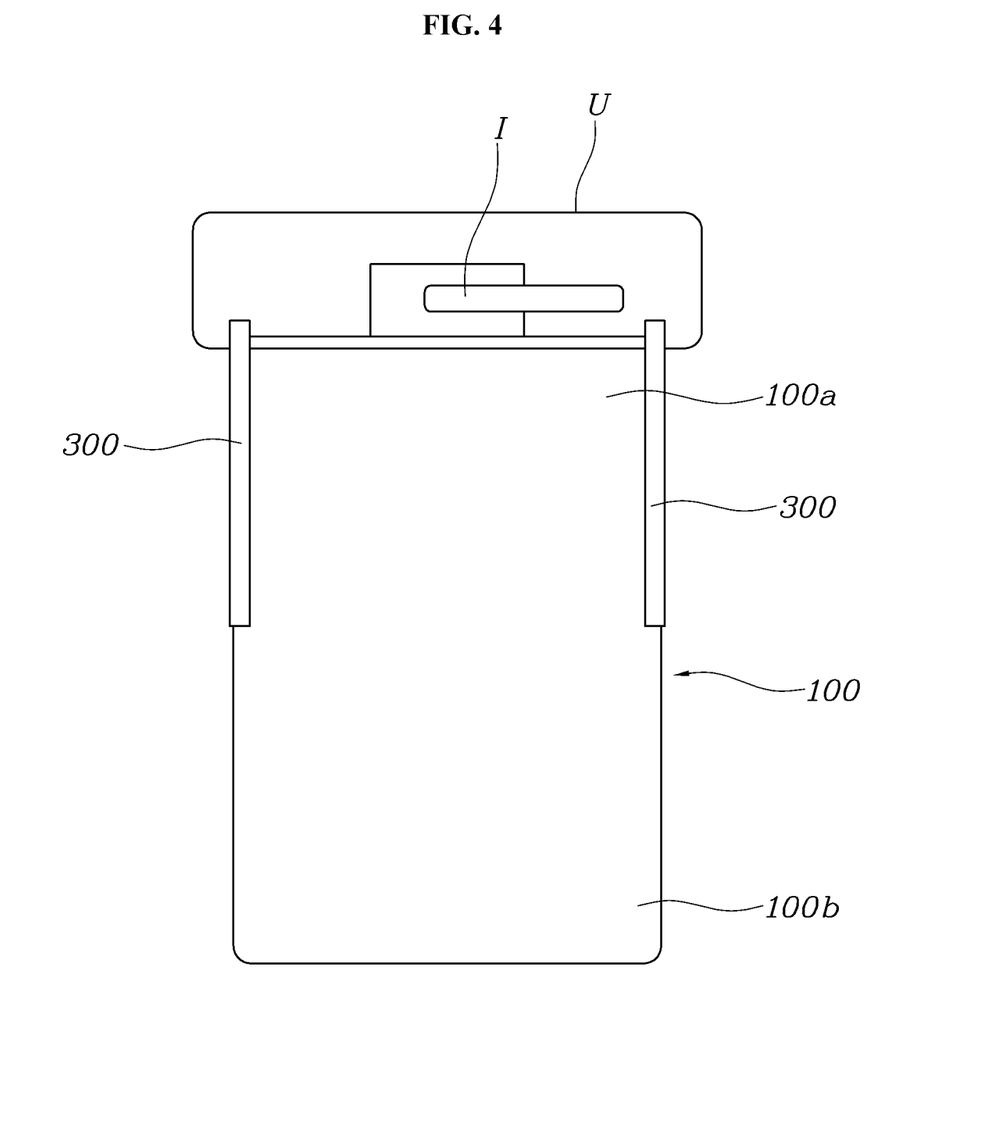
FIG. 4 is a view showing an airbag cushion according to a second embodiment of the present disclosure.
Figure 5:
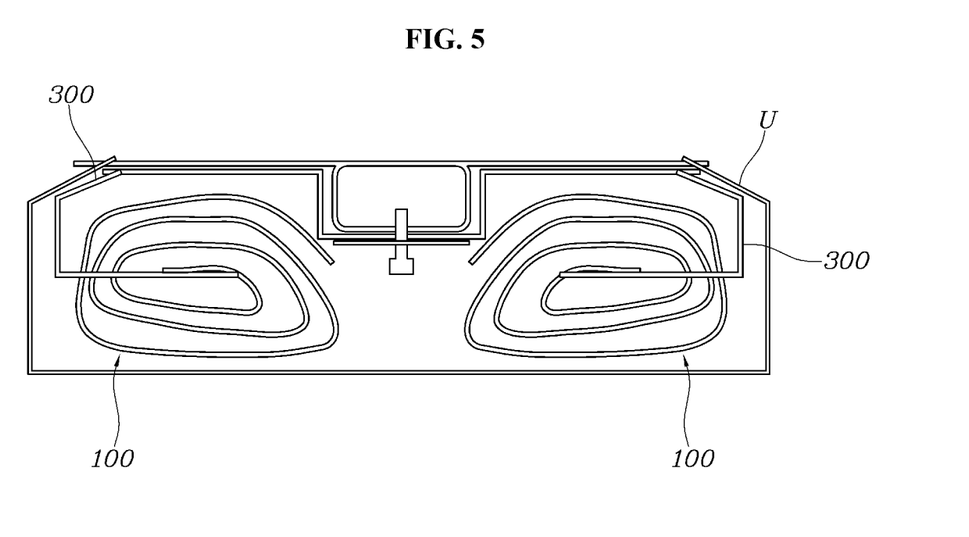
FIG. 5 is a view showing folding of the airbag cushion according to the second embodiment of the present disclosure shown in FIG. 4.

FIG. 1 is a view showing a roof airbag for a vehicle according to the present disclosure. FIG. 2 is a view showing a roof airbag for a vehicle according to a first embodiment of the present disclosure. FIG. 3 is a view showing folding of the airbag cushion according to the first embodiment of the present disclosure shown in FIG. 2. FIG. 4 is a view showing an airbag cushion according to a second embodiment of the present disclosure. FIG. 5 is a view showing folding of the airbag cushion according to the second embodiment of the present disclosure shown in FIG. 4.

Figure 6:
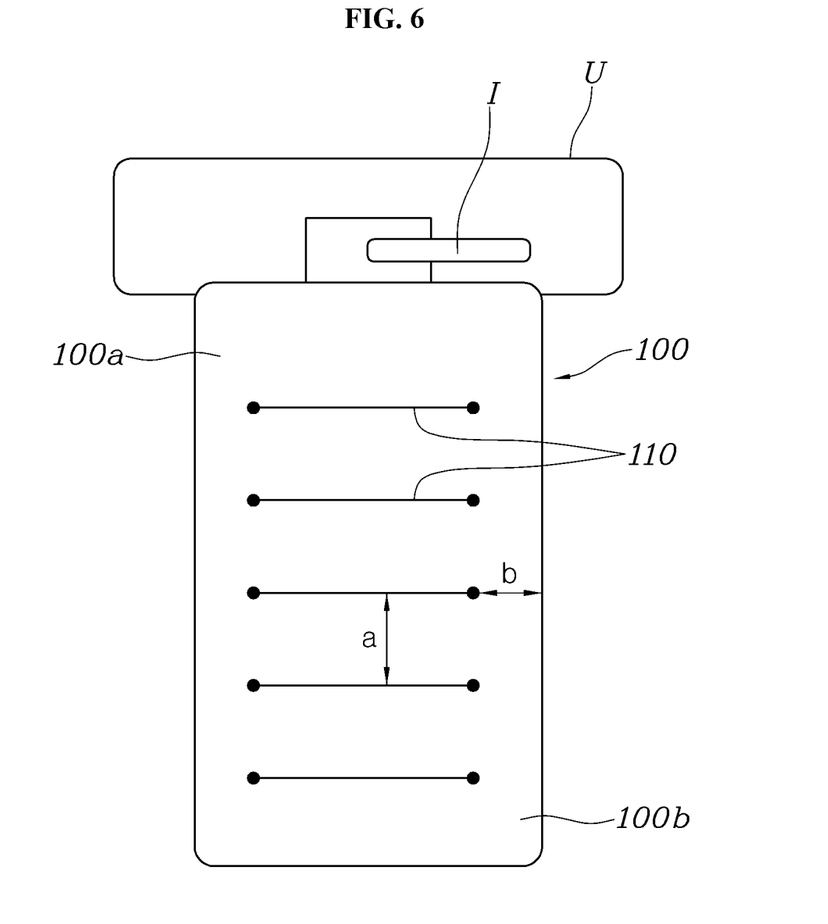
FIG. 6 is a view showing dead-lines of the airbag cushion according to the first embodiment of the present disclosure.
Figure 7:
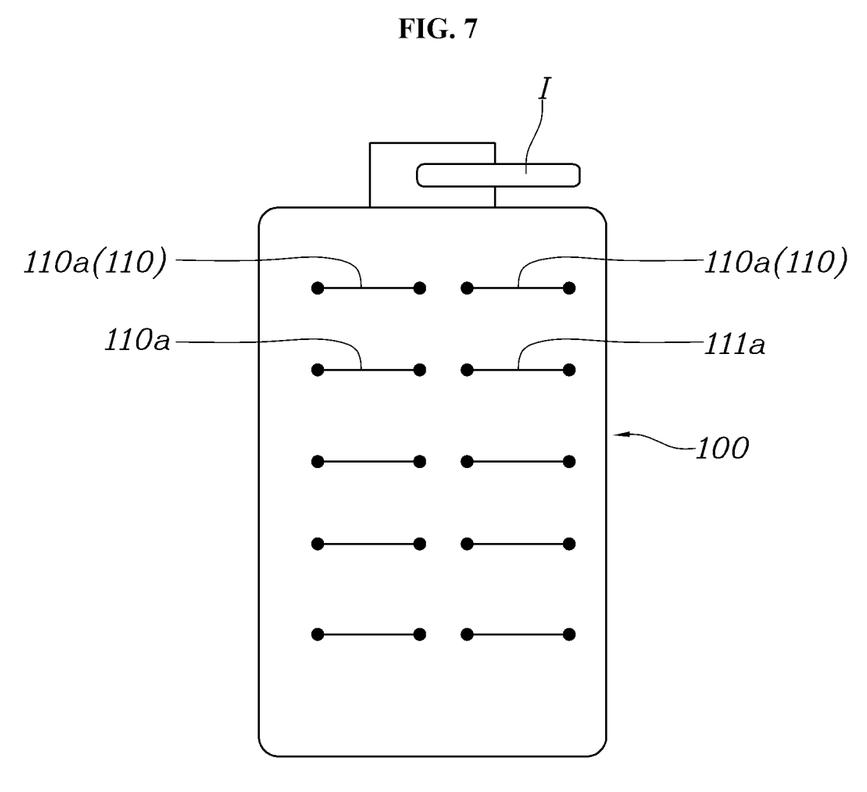
FIG. 7 is a view showing dead-lines of the airbag cushion according to the second embodiment of the present disclosure.
Figure 8:
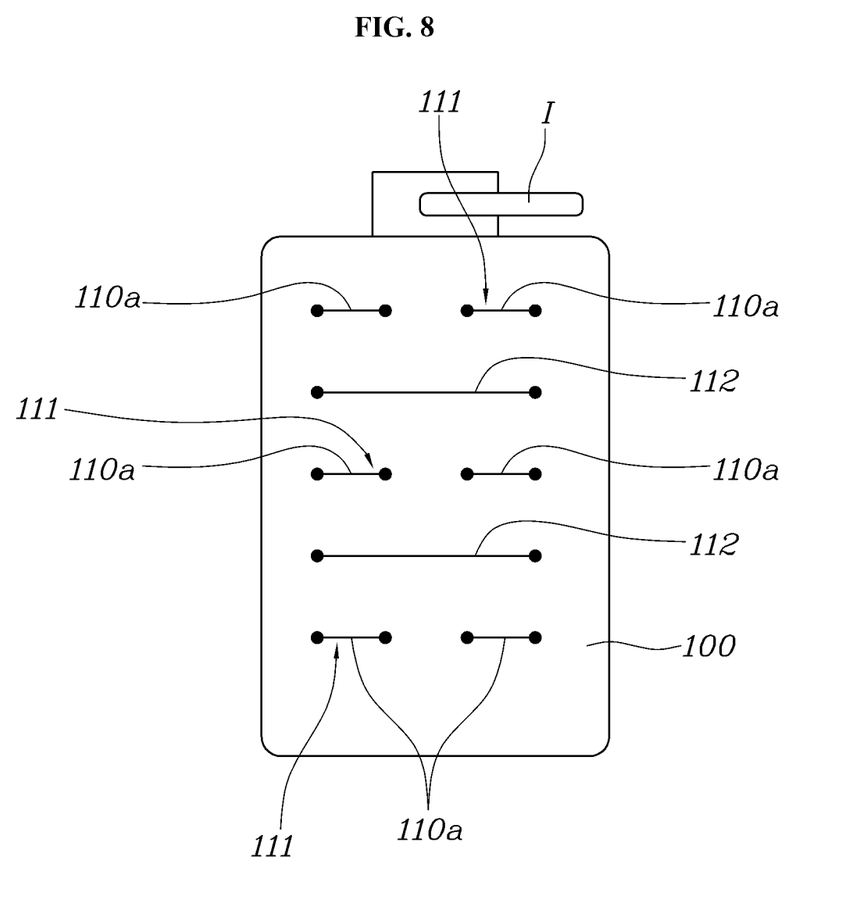
FIG. 8 is a view showing dead-lines of an airbag cushion according to a third embodiment of the present disclosure.
Figure 9:
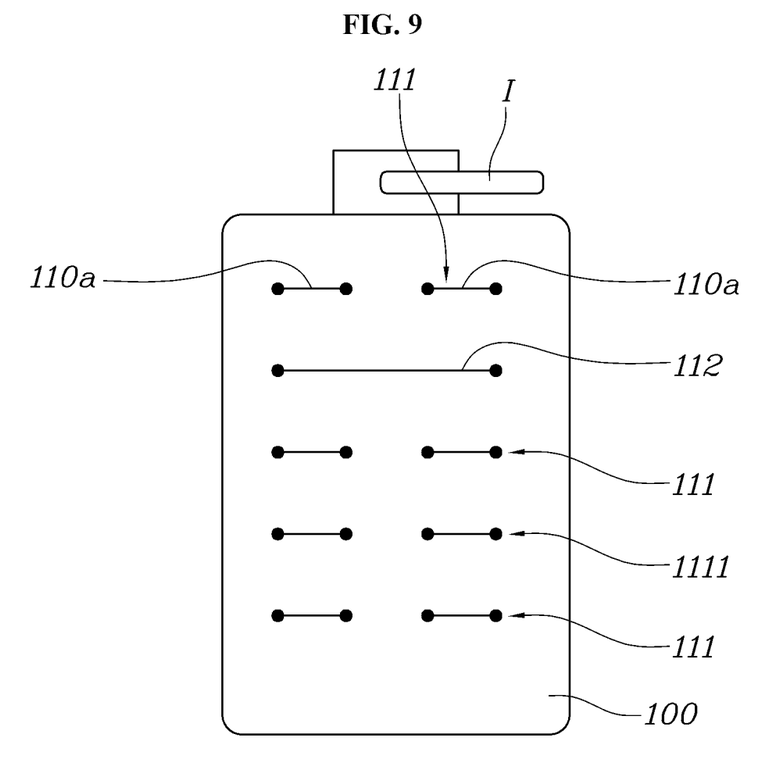
FIG. 9 is a view showing dead-lines of an airbag cushion according to a fourth embodiment of the present disclosure.
Figure 10:
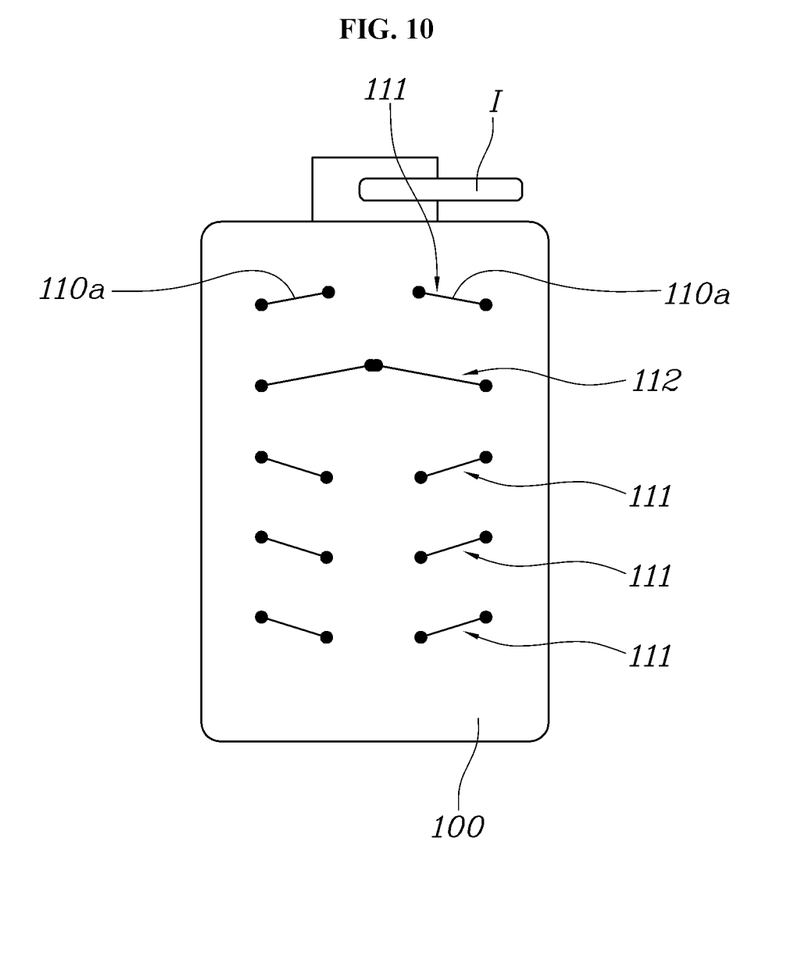
FIG. 10 is a view showing dead-lines of an airbag cushion according to a fifth embodiment of the present disclosure.

FIG. 6 is a view showing dead-lines of the airbag cushion according to the first embodiment of the present disclosure. FIG. 7 is a view showing dead-lines of the airbag cushion according to the second embodiment of the present disclosure. FIG. 8 is a view showing dead-lines of an airbag cushion according to a third embodiment of the present disclosure. FIG. 9 is a view showing dead-lines of an airbag cushion according to a fourth embodiment of the present disclosure. FIG. 10 is a view showing dead-lines of an airbag cushion according to a fifth embodiment of the present disclosure.

According to the present disclosure, as shown in FIG. 1, the roof airbag for a vehicle includes: an airbag cushion 100 unfolded downward from a roof and arranged in front of a seat; a main tether 200 of which opposite ends are connected to opposite ends of the airbag cushion 100 at a first surface of the airbag cushion 100, the main tether 200 being extended shorter than a vertical direction of the airbag cushion 100; and a sub-tether 300 of which a first end 310 is connected to the roof and a second end 320 is connected to a second surface of the airbag cushion 100.

The airbag cushion 100 is provided at an inside portion of the roof. The airbag cushion 100 may be supplied with inflation gas from an inflator I and may be unfolded downward from the roof and arranged between a plurality of seats.

The main tether 200 is connected to both the opposite ends of the airbag cushion 100 at the first surface of the airbag cushion 100. When a plurality of airbag cushions 100 is provided, the main tether may be a surface on which the airbag cushions 100 face to each other. In the main tether 200, as the main tether is formed shorter than the vertical direction of the airbag cushion 100, the airbag cushion 100 is limited to be unfolded by the length of the main tether 200, thus being bent.

Furthermore, the sub-tether 300 of which the first end 310 is connected to the roof and the second end 320 is connected to the second surface of the airbag cushion 100 is provided. The sub-tether 300 may be extended shorter than the length of the main tether 200. Therefore, when the airbag cushion 100 is unfolded, the airbag cushion 100 is bent while the inflation of the airbag cushion 100 is limited by the length of the main tether 200. As the sub-tether 300 guides a bending direction of the airbag cushion 100, a bent portion of the airbag cushion 100 may be directed to the seat.

Accordingly, when a passenger seated on a seat touches the bent portion of the airbag cushion 100 in a vehicle collision, the airbag cushion 100 of the present disclosure may improve a restraining force for the passenger and protect the safety of the passenger from an impact of the vehicle collision.

In describing the present disclosure in detail, when the airbag cushion 100 is unfolded, the sub-tether 300 may be preset in a connection position of the second end 320 and an extension length of the sub-tether, so that the portion of the airbag cushion bent by the main tether 200 is positioned at a location corresponding to the body of the passenger seated on the seat.

The sub-tether 300 guides the bending direction of the airbag cushion 100 while the first end 310 of the sub-tether 300 is connected to the roof and the second end 320 is connected to the second surface of the airbag cushion 100. Accordingly, based on a bent shape of the airbag cushion 100 bent by the main tether 200, the connection position of the second end 320 of the sub-tether 300 connected to the airbag cushion 100 or the extension length of the sub-tether 300 is preset, so that the bent portion of the airbag cushion 100 is located at the body of the passenger seated on the seat. Therefore, the upper body of the passenger is placed on an upper portion 100a of the airbag cushion 100 on the basis of the bent portion of the airbag cushion 100, and the lower body of the passenger is supported by a lower portion 100b of the airbag cushion 100 and may be safely protected.

Meanwhile, the first end 310 of the sub-tether 300 may be connected to the roof while being spaced apart from the airbag cushion 100 provided at the roof. By the arrangement of the sub-tether 300, an unfolding shape of the airbag cushion 100 may be efficiently achieved. The sub-tether 300 may be prevented from being broken as the airbag cushion 100 in unfolding hits the sub-tether 300.

Meanwhile, the sub-tether 300 of the present disclosure may be applied in various embodiments.

As a first example, as shown in FIGS. 2 and 3, the sub-tether 300 may be formed to have an area covering some areas or the entire area of the second surface of the airbag cushion 100. Furthermore, a vertical length of the sub-tether 300 may be formed longer than a half of the vertical length of the airbag cushion 100.

As described above, as the sub-tether 300 is formed to have the area covering the airbag cushion 100, a coupling portion between the sub-tether 300 and the airbag cushion 100 is enlarged to allow the sub-tether 300 and the airbag cushion 100 to be connected to each other by a strong coupling force. Furthermore, as the vertical length of the sub-tether 300 is formed longer than a half of the vertical length of the airbag cushion 100, the sub-tether 300 covers the airbag cushion 100 and a support force to the roof, which will be described below, may be secured.

On the basis of the bent portion of the airbag cushion 100, the sub-tether 300 may be formed to partially cover a portion of the airbag cushion 100 corresponding to the upper portion 100a of the airbag cushion 100, and may be formed to entirely cover a portion of the airbag cushion 100 corresponding to the lower portion 100b of the airbag cushion 100. Therefore, the weight of the sub-tether 300 may be reduced, a coupling force may be increased by the secured area of the sub-tether 300, and the support force to the roof may be secured.

In detail, the airbag cushion 100 is folded in a zigzag shape in folding before unfolding, and the sub-tether 300 covers the folded airbag cushion 100 thus guiding the airbag cushion 100 not to be unfolded toward the roof in unfolding of the airbag cushion 100 as the sub-tether 300 is supported by the roof.

As shown in FIG. 1, the airbag cushion 100 is provided to a roof-side portion of a vehicle body R with a housing U as a medium, and is not exposed to the inside of the vehicle by a headlining H before the airbag cushion 100 is unfolded. However, a gap exists between the roof-side portion of the vehicle body R and the headlining H, and when the airbag cushion 100 is unfolded, the airbag cushion 100 may be unfolded toward the gap between the roof-side vehicle body R and the headlining H.

Therefore, with the zigzag folded shape of the airbag cushion 100 when the airbag cushion is folded before unfolding, the airbag cushion may be efficiently unfolded downward from the roof. In addition, while the sub-tether 300 covers the folded airbag cushion 100, the sub-tether 300 is supported by the headlining H located at the roof in unfolding of the airbag cushion 100, and thus the airbag cushion 100 is prevented from being unfolded toward the gap between the roof-side vehicle body R and the headlining H.

Therefore, when the airbag cushion 100 is unfolded, the sub-tether 300 is supported by a roof-side portion of the headlining H and blocks the gap between the roof-side portion of the vehicle body R and the headlining H, whereby the airbag cushion 100 is prevented from being moved toward the gap between the roof-side portion of the vehicle body R and the headlining H and may be efficiently unfolded downward. Furthermore, the direction of the airbag cushion 100 bent by the sub-tether 300 is guided to be directed to the seat and thus the airbag cushion 100 may safely protect the passenger.

Meanwhile, in another embodiment, as shown in FIGS. 4 and 5, the sub-tether 300 includes a plurality of sub-tethers 300, and second ends 320 of the sub-tethers 300 may be respectively connected to the opposite side ends of the airbag cushion 100 at the second surface of the airbag cushion 100.

Therefore, as the plurality of sub-tethers 300 are connected to the opposite side ends of the airbag cushion 100 at the second surface of the airbag cushion 100, the sub-tethers 300 and the airbag cushion 100 may be connected to each other by a strong coupling force.

Furthermore, the airbag cushion 100 is folded to be wrapped in a circular shape when being folded before unfolding and each of the sub-tethers 300 is connected to one side end of the airbag cushion 100, so that unfolding of the airbag cushion 100 does not interfere. The airbag cushion 100 is wrapped such that one surface thereof is directed to the inside. Therefore, the airbag cushion 100 is released at the opposite side to the gap between the roof-side portion of the vehicle body R and the headlining H when the airbag cushion 100 is unfolded, the airbag cushion 100 avoids unfolding toward the gap between the roof-side portion of the vehicle body R and the headlining H. Furthermore, each of the sub-tethers 300 is connected to the one side end of the airbag cushion 100, unfolding of the airbag cushion 100 does not interfere with the sub-tether 300, so that the airbag cushion 100 may be efficiently unfolded downward from the roof.

According to the present disclosure, the airbag cushion 100 includes a dead-line 110, so that the shape of the airbag cushion 100 inflated by the gas supplied from the inflator I is maintained and the dead-line 110 guides a flow direction of the gas in the airbag cushion 100 to allow the airbag cushion 100 to be efficiently unfolded.

The dead-line 110 is a portion where the opposite surfaces of the airbag cushion 100 are attached to each other, and a flow of the gas is blocked at the portion with the dead-lines 110 in the airbag cushion 100. The dead-line 110 includes a plurality of dead-lines 110 formed to be spaced apart from each other along a longitudinal direction of the airbag cushion 100. The plurality of dead-lines 110 is extended in the transversal direction of the airbag cushion 100 such that opposite ends of each of the dead-lines 110 are respectively spaced apart from the opposite side ends of the airbag cushion 100. Accordingly, the airbag cushion 100 is prevented from being contracted in the transversal direction by the dead-lines 110 extended in the transversal direction. In the conventional airbag cushion 100, the dead-lines 110 are extended in the longitudinal direction of the airbag cushion, so that the conventional airbag cushion 100 is contracted in the longitudinal direction by the dead-lines 110, thus the passenger seated on the seat cannot be sufficiently protected. However, as the dead-lines 110 are extended in the transversal direction of the airbag cushion 100 of the present disclosure, transversal contraction of the airbag cushion 100 is prevented, and a transversal width of the airbag cushion 100 is secured when the airbag cushion 100 is inflated, thereby safely protecting the passenger. Furthermore, each of the dead-lines 110 is extended in the transversal direction of the airbag cushion 100 such that the opposite ends of the dead-line 110 are spaced apart from the opposite side ends of the airbag cushion 100. Therefore, the gas flows into gaps between the dead-lines 110 and the opposite side ends of the airbag cushion 100, so that the airbag cushion 100 may be efficiently unfolded in the longitudinal direction.

According to the present disclosure, the dead-lines 110 may be applied to the airbag cushion 100 in various embodiments.

As the first embodiment, as shown in FIG. 6, the dead-lines 110 are arranged in the longitudinal direction of the airbag cushion 100 at predetermined intervals, each of the intervals between the dead-lines 110 is larger than an interval between one end of each of the dead-lines 110 and one side end of the airbag cushion 100.

As described above, as the dead-lines 110 are arranged in the longitudinal direction of the airbag cushion 100 at the predetermined intervals, the overall shape of the airbag cushion 100 may be maintained by the dead-lines 110. Even though the airbag cushion 100 is inflated, the transversal contraction of the airbag cushion 100 is limited by the dead-lines 110 arranged in the longitudinal direction of the airbag cushion 100.

The interval a between one of the dead-lines 110 and another dead-line 110 may be formed larger than the interval b between the end of the dead-line and the side end of the airbag cushion 100. Therefore, the airbag cushion 100 may be efficiently unfolded as the gas flows through the gap between the opposite ends of the airbag cushion and the opposite ends of the dead-lines 110, and as the gas is moved into the intervals between the dead-lines 110 to inflate the airbag cushion 100, the passenger can be protected from an impact.

Furthermore, when the intervals between the dead-lines 110 are formed smaller than the intervals between the ends of the dead-lines 110 and the side ends of the airbag cushion 100, the intervals between the dead-lines 110 are narrowed and thus not safely protecting the passenger from an impact. As the side ends of the airbag cushion 100 are excessively inflated, the airbag cushion may not safely restrain the passenger. Therefore, the intervals between the dead-lines 110 is formed larger than the intervals between the ends of the dead-lines 110 and the side ends of the airbag cushion 100.

As a second embodiment, as shown in FIG. 7, each of the dead-lines 110 may include divided lines 110*a* divided in the transversal direction of the airbag cushion 100, thereby allowing the gas to flow through the divided lines 110*a*.

As described above, as the dead-lines 110 includes the divided lines 110*a* divided in the transversal direction of the airbag cushion 100, the gas flowing in the airbag cushion 100 may flow through outsides of the divided lines 110*a* and gaps between the divided lines 110*a*. Each of the divided lines 110*a* may be divided at the center portion of the airbag cushion 100, or may be divided on the basis of a portion where the gas is supplied from the inflator I. Therefore, even though the dead-lines 110 are provided in the airbag cushion 100, the gas of the inflator I flows through the gaps between the divided lines 110*a* of the dead-lines 110, so that the inflating speed of the airbag cushion 100 increases. Furthermore, as a flow of the gas is induced into the opposite sides of the airbag cushion 100 by the divided lines 110*a*, the airbag cushion 100 may rapidly achieve the inflated shape thereof.

Meanwhile, the dead-lines 110 may include first line portions 111 and second line portions 112. The first line portions 111 are provided to allow the gas to flow between the divided lines 110*a* divided in the transversal direction of the airbag cushion 100, and the second line portions 112 are extended in the transversal direction of the airbag cushion 100.

As described above, as the first line portions 111 and the second line portions 112 are formed in the longitudinal direction of the airbag cushion 100, inflating of the airbag cushion 100 is efficiently maintain, and the inflating speed of the airbag cushion 100 may be secured.

As the third embodiment described above, as shown in FIG. 8, the first line portions 111 and the second line portions 112 may be repeatedly arranged in an alternated manner in the longitudinal direction of the airbag cushion 100. The first line portions 111 and the second line portions 112 may be repeatedly arranged in an order of the first line portions 111 and the second line portions 112 with the portion where the gas is supplied from the inflator I as a start point.

Therefore, when the gas of the inflator I is supplied into the airbag cushion 100, the gas flows through the first line portions 111 of the divided lines 110*a*, so that initial unfolding speed of the airbag cushion 100 increases and thus the airbag cushion is rapidly unfolded from the roof to the interior of the vehicle. Furthermore, the gas passing through the first line portions 111 in the airbag cushion 100 is moved toward the sides of the airbag cushion 100 while flowing through the second line portions 112. Therefore, while inflating of the airbag cushion 100 is partially achieved, the gas passes through the first line portions 111 and the second line portions 112 and then the airbag cushion 100 may be fully unfolded at a high speed.

Meanwhile, as a fourth embodiment, as shown in FIG. 9, the dead-lines 110 may be arranged such that the first line portions 111 and the second line portions 112 are provided in the longitudinal direction of the airbag cushion 100 and then the first line portions 111 are repeatedly arranged.

Therefore, when the gas of the inflator I is supplied into the airbag cushion 100, the gas flows through the first line portions 111 of the divided lines 110*a*, so that initial unfolding speed of the airbag cushion 100 increases and thus the airbag cushion is rapidly unfolded from the roof to the interior of the vehicle. Furthermore, the gas passing through the first line portions 111 in the airbag cushion 100 is moved toward the sides of the airbag cushion 100 while flowing through the second line portions 112. As described above, while inflating of the airbag cushion 100 is partially achieved, the gas passes through the first line portions 111 repeatedly arranged, and thus the airbag cushion 100 may be rapidly unfolded. In addition, as the first line portions 111 constitute the divided lines 110*a*, a flow of the gas is moved to both the center portion and opposite sides of the airbag cushion 100, so that the airbag cushion 100 may be rapidly unfolded and precisely inflated.

Meanwhile, as a fifth embodiment, as shown in FIG. 10, among the plurality of first line portions 111, a first line portion 111 located close to the inflator I in the airbag cushion 100 is extended with outer ends of the divided lines 110a inclined in an inflated direction of the airbag cushion 100 and remaining first line portions 111 extended with inner ends of the divided lines 110a inclined in the inflated direction of the airbag cushion 100.

Furthermore, the second line portion 112 may be provided such that a center portion thereof is bent to be directed toward a gap between the divided lines 110a of the first line portion 111 closest to the inflator I.

Therefore, when the gas of the inflator I is supplied into the airbag cushion 100, the gas flows through the first line portions 111 of the divided lines 110a, so that initial unfolding speed of the airbag cushion 100 increases and thus the airbag cushion is rapidly unfolded from the roof to the interior of the vehicle. Specifically, as the first line portion 111 closest to the inflator I is extended such that the outer ends of the divided lines 110a are inclined in the inflated direction of the airbag cushion 100, a flow of the gas is induced in the inclined directions of the divided lines 110a and the airbag cushion 100 may be inflated at a high speed in both the transversal direction and the longitudinal direction of the airbag cushion 100.

Then, the gas passing through the first line portions 111 closest to the inflator I in the airbag cushion 100 is moved toward the opposite sides of the airbag cushion 100 through the second line portion 112, so that a transversally inflated state of the airbag cushion 100 may be maintained. As the second line portion 112 is provided such that the center portion thereof is bent to be directed toward the gap between the divided lines 110a of the first line portion 111 closest to the inflator I, the gas flowing through the gap between the divided lines 110a of the first line portion 111 is moved to the opposite sides of the airbag cushion 100 by a bent portion of the second line portion 112, so that transversal unfolding of the airbag cushion 100 may be rapidly performed.

Meanwhile, as the remaining first line portions 111 arranged after the second line portions 112 are arranged such that the inner ends of the divided lines 110a are inclined in the inflated direction of the airbag cushion 100, while the airbag cushion 100 is transversally inflated, the gas in the airbag cushion is induced to the center portion of the airbag cushion 100 along inclined directions of the divided lines 110a of the remaining first line portions 111, and an unfolding speed of the airbag cushion 100 further increases.

As the airbag cushion 100 passes through the first line portions 111 that are closest to the inflator I and the second line portion 112, while an initial unfolding speed of the airbag cushion 100 increases and a transversally inflated shape of the airbag cushion is maintained, the gas in the airbag cushion 100 is concentrated toward the center in the airbag cushion 100 by the divided lines 110a of the remaining first line portions 111. As the gas partially flows toward the side ends of the airbag cushion 100, an unfolding speed of the airbag cushion 100 increases and a fully unfolding shape of the airbag cushion 100 may be rapidly achieved.

The roof airbag for a vehicle with the above-described structure is configured such that the airbag cushion 100 is unfolded downward from the inner roof to protect the passenger seated on the seat, and the airbag cushion 100 is formed to be bent toward the passenger by the main tether 200 and the sub-tether 300. Accordingly, a restraining force for the passenger is secured and the passenger can be safely protected from an impact. Furthermore, the airbag cushion 100 is efficiently unfolded by the sub-tether 300 without insertion between the roof-side portion of the vehicle body and the headlining.

Specifically, the transversal contraction of the airbag cushion 100 is prevented and the unfolding shape of the airbag cushion is maintained. Furthermore, the fluidity of the gas flow in the airbag cushion 100 is secured, and the airbag cushion 100 is rapidly unfolded.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A roof airbag for a vehicle, comprising:
    an airbag cushion folded in a circular shape and configured to inflate and unfold downwardly from a roof of the vehicle when a gas is supplied from an inflator, the airbag cushion having first and second surfaces mutually facing in opposite directions, the second surface configured to be touched by a passenger when the airbag cushion is unfolded downwardly;
    a main tether having both ends respectively connected to upper and lower end portions of the first surface of the airbag cushion, the main tether being shorter than a vertical length of the airbag cushion so as to cause the airbag cushion to bend when the airbag cushion is unfolded; and
    a plurality of sub-tethers configured to guide unfolding of the airbag cushion when the airbag cushion is unfolded, each sub-tether at least partially covering the second surface of the airbag cushion and having a first end connected to the roof and a second end connected to one of a plurality of side edge portions of the second surface of the airbag cushion so as to prevent the airbag cushion from interfering with the unfolding of the sub-tether.

2. The roof airbag of claim 1, wherein the sub-tether is shorter than the main tether.

3. The roof airbag of claim 1, wherein (1) a connection position of the second end of the sub-tether to the second surface of the airbag cushion and (2) an extended length of the sub-tether are set to position a bent portion of the airbag cushion at a location corresponding to a body of the passenger seated on a seat of the vehicle when the airbag cushion is unfolded.

4. The roof airbag of claim 1, wherein the sub-tether is configured to cover the folded airbag cushion and is supported by the roof when the airbag cushion is unfolded to prevent the airbag cushion from unfolding toward the roof.

5. The roof airbag of claim 1, wherein the sub-tether has a first vertical length greater than a half of a second vertical length of the airbag cushion.

6. The roof airbag of claim 1, wherein the first end of the sub-tether is connected to the roof and spaced apart from the airbag cushion.

7. The roof airbag of claim 1, wherein:
    the airbag cushion comprises a plurality of dead-lines conjoining the first and second surfaces of the airbag cushion and configured to block a flow of the gas supplied from the inflator,
    the plurality of dead-lines is spaced apart from each other in a longitudinal direction of the airbag cushion and extends in a transverse direction of the airbag cushion while both ends of each dead-line are spaced apart from the side edge portions of the second surface of the airbag cushion, respectively, and
    the longitudinal direction of the airbag cushion corresponds to an inflation direction of the airbag cushion.

8. The roof airbag of claim 7, wherein:
the plurality of dead-lines is spaced apart from each other at a predetermined interval along the longitudinal direction of the airbag cushion, and
the predetermined interval between the dead-lines is greater than an interval between one end of each dead-line and a side edge of the airbag cushion.

9. The roof airbag of claim 7, wherein:
the plurality of dead-lines comprises a plurality of divided lines, each divided line being divided in the transverse direction of the airbag cushion, and
the plurality of dead-lines is configured to allow the gas to flow between the divided lines.

10. The roof airbag of claim 9, wherein the plurality of dead-lines comprises:
one or more first line portions configured to allow the gas to flow between the divided lines; and
one or more second line portions extending in the transverse direction of the airbag cushion.

11. The roof airbag of claim 10, wherein the first and second line portions are arranged alternately in the longitudinal direction of the airbag cushion.

12. The roof airbag of claim 10, wherein the plurality of dead-lines comprises:
a first group comprising the first and second line portions arranged in the longitudinal direction of the airbag cushion; and
a second group comprising the first line portions arranged repeatedly.

13. The roof airbag of claim 12, wherein:
one of a plurality of first line portions closest to the inflator is extended to cause an outer end of the divided line to be inclined in the inflation direction of the airbag cushion, and
the other or others of the plurality of first line portions are extended to cause an inner end of the divided line to be inclined in the inflation direction of the airbag cushion.

14. The roof airbag of claim 13, wherein a center portion of the second line portion is bent toward the divided lines of the first line portion that is closest to the inflator.

* * * * *